July 15, 1924.
F. LJUNGSTRÖM
1,501,123
TOOTHED WHEEL WITH RESILIENT TEETH
Filed Feb. 2, 1920
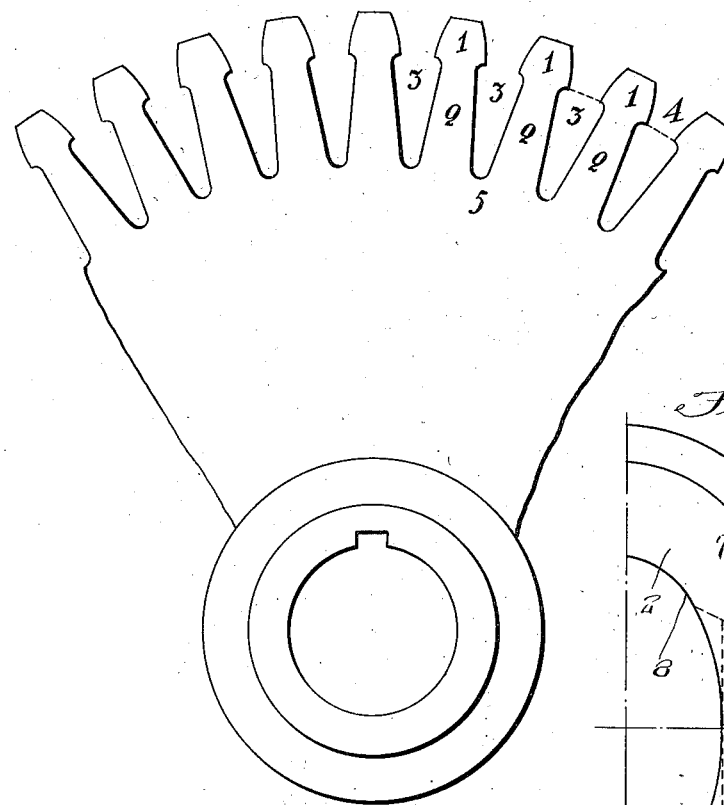
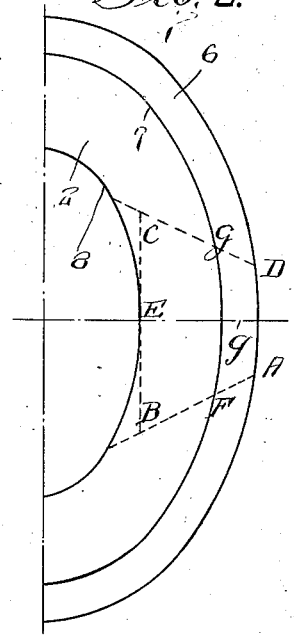
Inventor
F. Ljungström.
By H. R. Kerslake
Atty.

Patented July 15, 1924.

UNITED STATES PATENT OFFICE.

FREDRIK LJUNGSTRÖM, OF BREVIK, LIDINGON, SWEDEN, ASSIGNOR TO AKTIEBOLAGET LJUNGSTRÖMS ANGTURBIN, OF STOCKHOLM, SWEDEN, A CORPORATION.

TOOTHED WHEEL WITH RESILIENT TEETH.

Application filed February 2, 1920. Serial No. 355,640.

*To all whom it may concern:*

Be it known that I, FREDRIK LJUNGSTRÖM, a subject of the King of Sweden, residing at Brevik, Lidingon, in the Kingdom of Sweden, have invented certain new and useful Improvements in Toothed Wheels with Resilient Teeth, of which the following is a specification.

The present invention relates to a toothed wheel with resilient teeth of great strength and capacity of adaptation.

The invention consists therein that the gear is provided with tooth spaces of greater depth than ordinarily used, and it further consists in the teeth, which are provided with working or bearing surfaces, are arranged on webs or the like connected with the gear, such webs being in the peripherical direction narrower than the teeth at the taper between tooth and web.

In the accompanying drawing two embodiments of the invention is shown by way of example, Figure 1 showing a part of a toothed wheel having straight teeth and Figure 2 a portion of a spiral cut tooth viewed in the longitudinal direction of the shaft. The tooth 1 is formed on a web or the like 2 of relatively great length. This web is in the proximity of the tooth 1 narrower than the latter, so that the tooth spaces 3 between the webs will be larger at the top than the adjacent spaces 4 between the teeth 1. Thus, this space 3 has a shape giving the tooth 1 a relatively long inwardly extending web.

The lack of uniformity in the pitch of the teeth etc., which cannot be avoided, is neutralized by teeth shaped according to the present invention, the same being adapted to accommodate themselves to a more uniform operation owing to the resiliency thereof. Previously, endeavors have been made to construct resilient teeth by milling interstices between them. These interstices, however, have not given the teeth such a shape as is requisite in order to obtain the least stresses possible, particularly at the bottoms 5 of the interstices where the material is strained by shearing stresses. To diminish these stresses, the tooth space 3 must end with a rounded bottom 5, the curvature of it being circular with as great a radius as possible. This shape, in fact, is obtainable by constructing the teeth according to the present invention.

The formation of the teeth as hereinabove described will be found to be of particular advantage when applied to spiral cut gear wheels.

This advantage will appear from Fig. 2 showing in the longitudinal direction of the shaft a portion of a tooth in a toothed wheel having spiral cut teeth. In Fig. 2, 6 is the operating surface of the tooth and 7 is the shoulder between the surface 6 and the side surface of the web 2. 8 designates the bottom of the interspace between the teeth. Forces actuating the tooth for instance in the point 9 are distributed over a greater surface of the tooth owing to its spring which circumstance upon examination has proved to be very advantageous in sections on lines A—F—B, B—E—C and D—G—C. Of course, this fact is most prominent in case of spiral cut wheels because of a greater number of teeth of one wheel being in mesh with teeth of the other wheel, the teeth, besides, accommodating themselves, on account of the spring, so as to effect an equal pressure of the teeth in all points of engagement.

What I claim as new and desire to secure by Letters Patent of the United States is:—

In toothed wheels, wherein all the teeth are made in one piece and are resilient by means of the tooth spaces being deeper than required by the normal tooth profile, the combination of spiral cut teeth with webs integral with the wheel and being narrower in peripheral direction than the teeth at the taper between the tooth and the web.

In testimony whereof I affix my signature in presence of two witnesses.

FREDRIK LJUNGSTRÖM.

Witnesses:
P. H. BERGROTH,
OSCAR GRAHN.